United States Patent [19]
Naito

[11] Patent Number: 5,813,704
[45] Date of Patent: Sep. 29, 1998

[54] FLEXIBLE JOINT

[75] Inventor: Takahiko Naito, Kawaguchi, Japan

[73] Assignee: Sankei Giken Kogyo Kabushiki Kaisya, Tokyo, Japan

[21] Appl. No.: 816,885

[22] Filed: Mar. 13, 1997

[30] Foreign Application Priority Data

Mar. 15, 1996 [JP] Japan .................................. 8-087548

[51] Int. Cl.$^6$ .................................................. F16L 55/02
[52] U.S. Cl. .......................................... 285/226; 285/299
[58] Field of Search ................................. 285/297, 300, 285/226

[56] References Cited

U.S. PATENT DOCUMENTS

| | | | |
|---|---|---|---|
| 2,712,456 | 7/1955 | McCreery | 285/299 |
| 4,659,117 | 4/1987 | Holzhausen et al. | 285/299 |
| 5,083,817 | 1/1992 | Holzhausen et al. | 285/299 |
| 5,145,215 | 9/1992 | Udell | 285/300 |
| 5,358,287 | 10/1994 | Winzen | 285/300 |
| 5,511,828 | 4/1996 | Kurek et al. | 285/300 |
| 5,639,127 | 6/1997 | Davey | 285/300 |

*Primary Examiner*—Eric K. Nicholson
*Attorney, Agent, or Firm*—Armstrong, Westerman, Hattori, McLeland & Naughton

[57] ABSTRACT

The invention is concerned with a flexible joint to be used for the exhaust system of an internal combustion engine in, for example, automobile, etc., and aims at providing such flexible joint which has good durability and is easy in assembling the structural parts and in setting the spring constant. The flexible joint according to the present invention is of such a construction, comprising the bellows 1 in wave-form in its cross-section, a cylindrical blade 2 covering the outer periphery of the bellows, and ring-shaped protector 3*a*, 3*b* fittingly held on the outer periphery at both end parts of the blade, the both end parts of the blade being made to run on and along the outer periphery of the end part 10 of the bellows 1, wherein the blade and each protector are overlayed and closely put together on the lateral side surface 11 of the ridge part of both end parts of the wave-shaped bellows, and at least one of the protectors and the blade 2 are subjected to the spot-welding, or other means, to integrally fix them at their overlayed portion.

3 Claims, 6 Drawing Sheets

FLEXIBLE JOINT

BACKGROUND OF THE INVENTION

1. Field of the Invention

The present invention is generally concerned with a flexible joint and more particularly, with a flexable joint which is to be used for an exhaust system of an internal combustion engine of, for example, automobiles, etc.

2. Description of the Prior Art

In the exhaust system of an internal combustion engine, as mentioned above, it has already been known to interpose a flexible joint in one part of the exhaust system to absorb vibrations from the internal combustion engine, vibrations from the vehicle chassis, and other vibrations. For a kind of such flexible joint, bellows made of thin metal plate has conventionally used. Furthermore, a conventional flexible joint has a construction that, with a view to protecting the bellows as well as and suppressing the flexure thereof. The outer periphery of such a bellows is covered with a cylindrical braid, and both end parts thereof are fixed by a ring-shaped protector (for example, Japanese Utility Model Laid-Open No. 60-159821, Japanese Patent Laid-Open No. 7-224647, and others).

FIG. 5 of the accompanying drawing is a front elevational view, partly in longitudinal cross-section, showing a structural example of a conventional flexible joint provided with a bellows, braids, and a protector, as mentioned in the foregoing; and FIG. 6 is an enlarged view of the main part of the flexible joint shown in FIG. 5.

In the drawing, a reference numeral 1 designates the bellows, which is formed of a thin metal plate, etc. in a wavy shape, and, on each of both end parts of which there is integrally connected a cylindrical part 10. A reference numeral 2 designates the braids made of metal wire rods, etc. woven in a cylindrical form. The braids 2 are made to cover the outer periphery of the bellow 1, and both end parts 2a, 2b thereof are reduced in diameter so as to run on and along the outer peripheral surface of the abovementioned cylindrical part 10.

On the outer periphery of each of the end parts of the braid 2 with a reduced diameter a protector 3a, 3b, made of metal plate or simular, is fitted to hold the end parts 2a, 2b of the braid 2 between each of the protectors 3a, 3b and the cylindrical part 10 of the bellows 1, and these parts, as overlaid, are integrally connected and fixed by means of the spot-welding W, or other expedients. In the drawing, reference symbols P1 and P2 designate exhaust pipes fittingly connected to both end parts of the bellows 1.

However, since the conventional flexible joint as described in the above is of such a construction that each protector 3a, 3b is disposed at a position outwardly separated, in the axial direction, from the ridge part 11 at both end parts of the bellows 1, and each of the protectors 3a, 3b, the braid 2, and the bellows 1 are fixed together by the spot-welding, etc. on the cylindrical part 10 of the bellows, it has various disadvantages such that, when the bellows 1 expand or contract or flex due to vibrations from the engine, chassis, etc., to cause a force to act on the braid, which tends to pull the braid in the axial direction, the tensile force concentrates on the abovementioned fixed part due to a small contact area existing between the braid and the ridge part (or outer diameter part) 11 at both end parts of the bellows.

On account of this, there is apprehension such that, in the course of the abovementioned actions being repeated, the braid 2 is liable to fall off the abovementioned fixed part with the consequence that the anti-vibration capability and the durability of the flexible joint decreases. Further, at the time of assembling the braid to the bellows 1, the degree of tension on the braid is required to be adjusted and the spring constant of the flexible joint to be set in a desired range. However, the abovementioned conventional flexible joint had the problem of its inability to make fine and delicate adjustment, and so forth.

SUMMARY OF THE INVENTION

It is therefore an object of the present invention to provide a flexible joint which is durable, which is and easy in its assemble and which has a spring constant that can be easily set.

With a view to attaining the abovementioned object, the flexible joint according to the present invention is constructed as follows.

That is to say, the flexible joint of the present invention comprises the bellows having a wave-like or sinusoidal cross-section, the cylindrical braid covering the outer periphery of the bellows, and a ring-shaped protector fittingly held on the outer periphery of the cylindrical braid at both end parts thereof, wherein both end parts of the braid are made to run on and along the outer periphery of the both end parts of the bellows, respectively.

This flexible joint is characterized in that on the lateral side surface of the ridge part of both end parts of the abovementioned wave-shaped bellows, the abovementioned braid and each protector are overlaid and closely put together in the order as mentioned. Then at least either one of or both of the protector and the braid are subjected to spot-welding, or other fixing means, so as to be integrally fixed at the abovementioned overlaid portion.

The foregoing object, and other objects, as well as the specific construction and function of the flexible joint according to the present invention, will become more apparent and understandable from the following description thereof, when read in conjunction with the accompanying drawing.

BRIEF DESCRIPTION OF THE ACCOMPANYING DRAWING

DETAILED DESCRIPTION OF PREFERRED EMBODIMENT

In the following, the flexible joint according to the present invention will be explained specifically in reference to the accompanying drawing.

Figure 1:
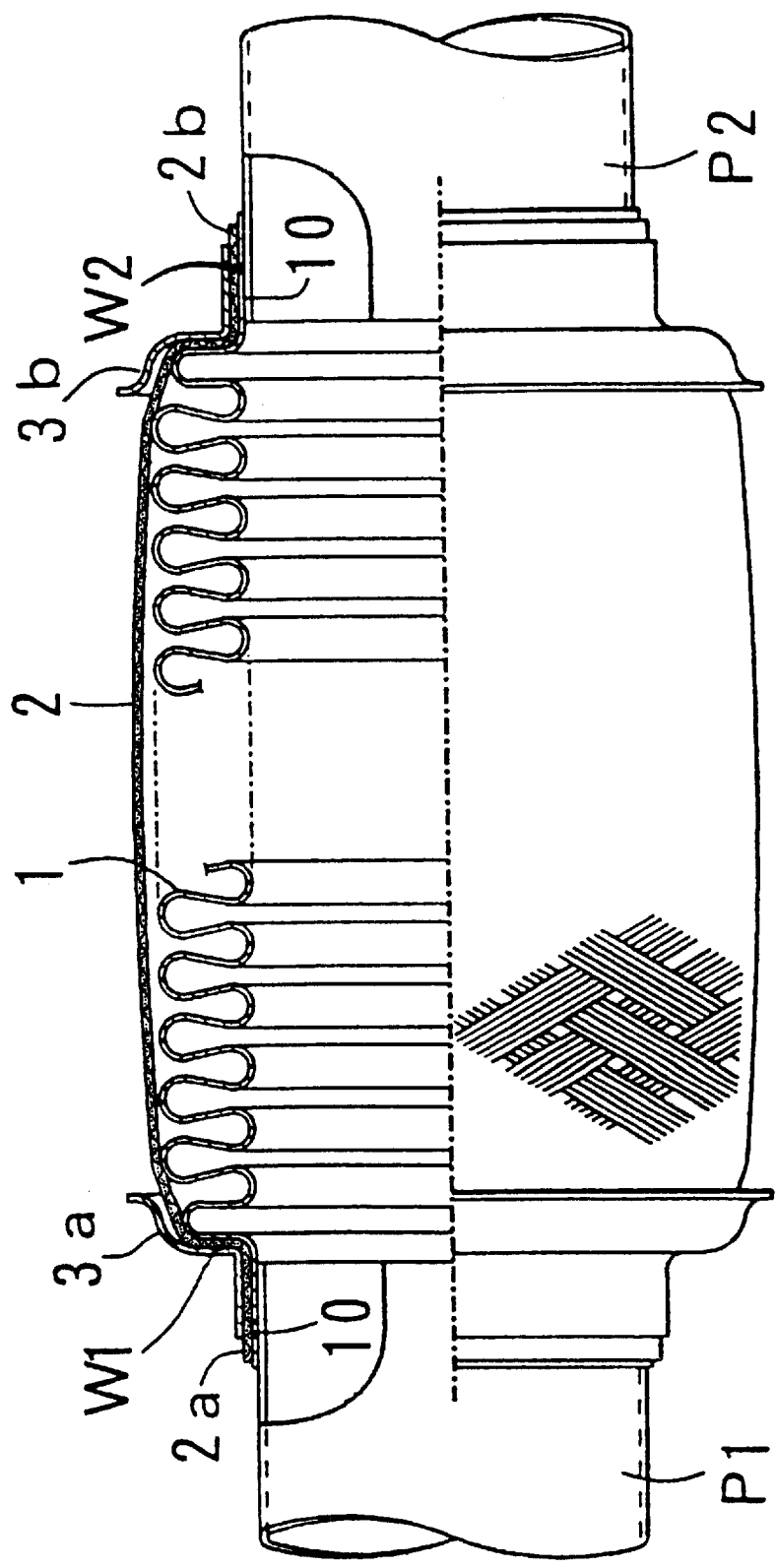
FIG. 1 is a front elevational view, partly in longitudinal cross-section, showing a first embodiment of the flexible joint according to the present invention.
Figure 2:
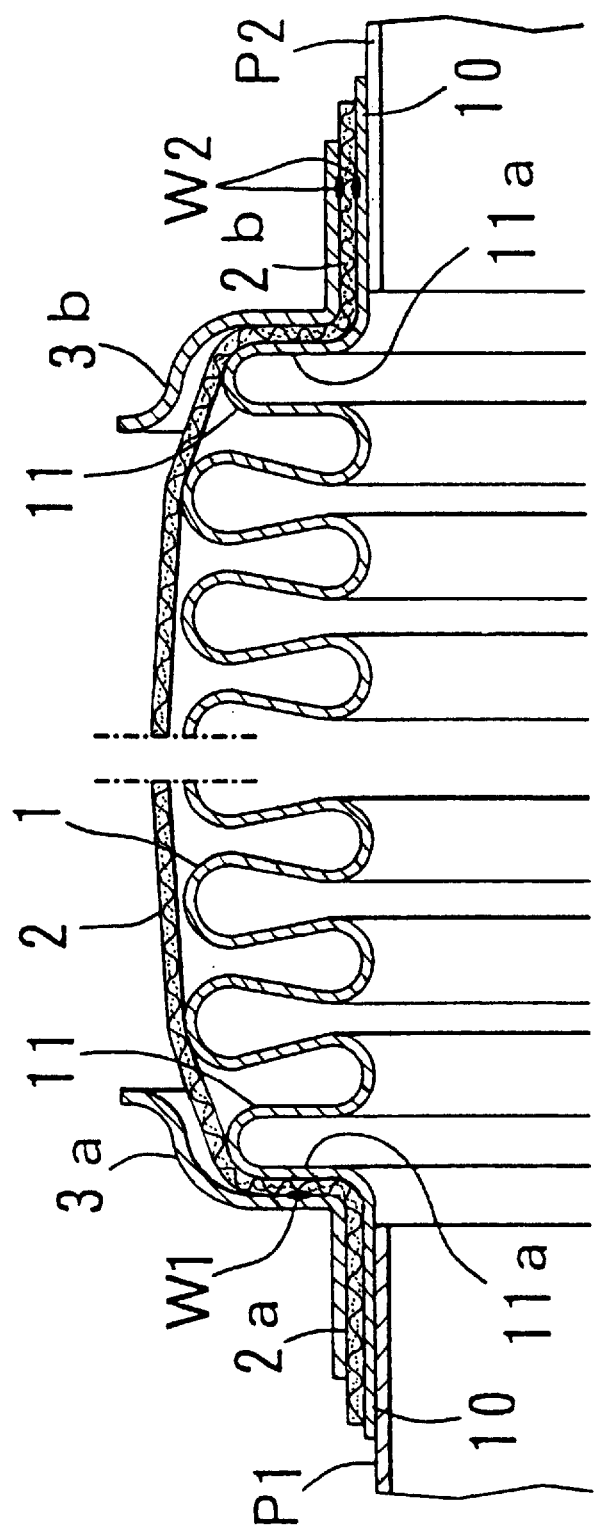
FIG. 2 is an enlarged view of the main part of the flexible joint shown in FIG. 1.

FIG. 1 is a front elevational view partly in longitudinal cross-section showing a first embodiment of the flexible joint according to the present invention, and FIG. 2 is an enlarged view of the main part of the flexible joint shown in FIG. 1, wherein the same component parts having the same functions as those in the above-described conventional flexible joint are designated by the same reference numerals.

The flexible joint shown in FIGS. 1 and 2 is of such a construction that the braid 2 and each of the protectors 3a, 3b are overlaid and closely put together, in the order as above mentioned, on the lateral side surface 11a of the ridge part 11 at both end parts of the wave-shaped bellows 1, and then the protector 3a at the left side (as viewed in the drawing figures and the braid 2 are integrally fixed by spot-welding W1 at the abovementioned overlaid part 31 (that is, the flanged part of the protector 3a corresponding to the abovementioned lateral side surface 11a of the ridge part 11). By the way, in the illustrated embodiment, the other protector 3b is integrally fixed by spot-welding W2, or other expedients, on the cylindrical part 10 of the bellows 1 through the braid 2, although the protector 3b may also be tightly fixed at the position corresponding to the lateral side surface 11a of the ridge part at the end part of the bellows 1, as is the case with the protector 3a.

By thus sequentially overlaying and closly putting together the braid 2 and each protector 3a, 3b on the lateral side surface 11a of the ridge part 11 at both end parts of the bellows, and then by integrally fixing, at least, the protector 3a and the braid 2 by spot-welding W1, etc. at the abovementioned overlaid part 31, as above-described, it is possible to prevent the tensile force from being concentrated on the fixed part of the braid 2 by the abovementioned spot-welding W1, etc., when the force acts on the braid 2 tending to pull the bellows in the axial direction, as in the conventional flexible joint.

When the outer peripheral surface of the bellows 1 is to be covered with the braid 2, it can be done in such a manner that, for example, one end 2a of the braid 2 is made to run on and along the inner surface of the abovementioned protector 3a, and in this state, the braid is tightly fixed to the bellows by the abovementioned spot-welding W1, etc. at the position corresponding to the lateral side surface 11a of the ridge part of the bellows 1. Then, the protector 3a is fitted onto the cylindrical part 10 at a first end side of the bellows 1, while covering the outer periphery of the bellows 1 with the second end 2b of the braid 2. Thereafter, in the state of the second end 2b of the braid 2 running on and along the cylindrical part 10 of the second end of the bellows 1, the second protector 3b is fitted on the outer periphery of the bellows 1. The bellows 1 and braid 2 are then tightly fixed to each other by means of spot-welding W2. The protector 3a and the first end 2a of the braid 2, which are fixed together at the position corresponding to the lateral side surface 11a of the ridge part 11, may be integrally fixed with the bellows 1 by means of welding, or similar, through the cylindrical part 10 of the bellows 1, and others.

As described in the foregoing, when the braid 2 is made to cover the bellows 1, since the first end part 2a of the braid 2 at the side of the protector 3a is tightly fixed to the protector 3a by means of spot-welding W1, or similar, the covering can be done easily without the possibility of unexpectedly narrowing, and yet the tensile force of the braid 2 can be adjusted easily. As the result, the spring constant of the flexible joint can be readily set at a desired value without failure, whereby, as shown in FIG. 3 for example, the covering can be readily effected in the state of the braid 2 being in close contact with the ridge part of the bellows 1 over substantially the entire length in the longitudinal direction thereof.

Incidentally, the ridges of the bellows 1, according to the illustrated embodiment, are made to have a cross-section in the shape of a letter "U" substantially at both end parts thereof, and in the shape of a letter "omega ($\Omega$)" at the intermediate part thereof. It may, however, be feasible that the entire wave-form can be made U-shaped or 2-shaped in cross-section. Further, in the illustrated embodiment, the height of the ridge (outer diameter) at both end parts of the bellows is made shorter than that at the intermediate part. It is, however, possible that the outer diameter can be made substantially the same over the entire length of the bellows. In addition, the bellows 1 in the illustrated embodiment is in a single-layer structure made up of a single sheet of thin metal plate, although it may be in a multi-layered structure made up of a plurality of laminated thin metal sheets. This laminated layer may consist of a heat-insulating material, and others.

Figure 3:
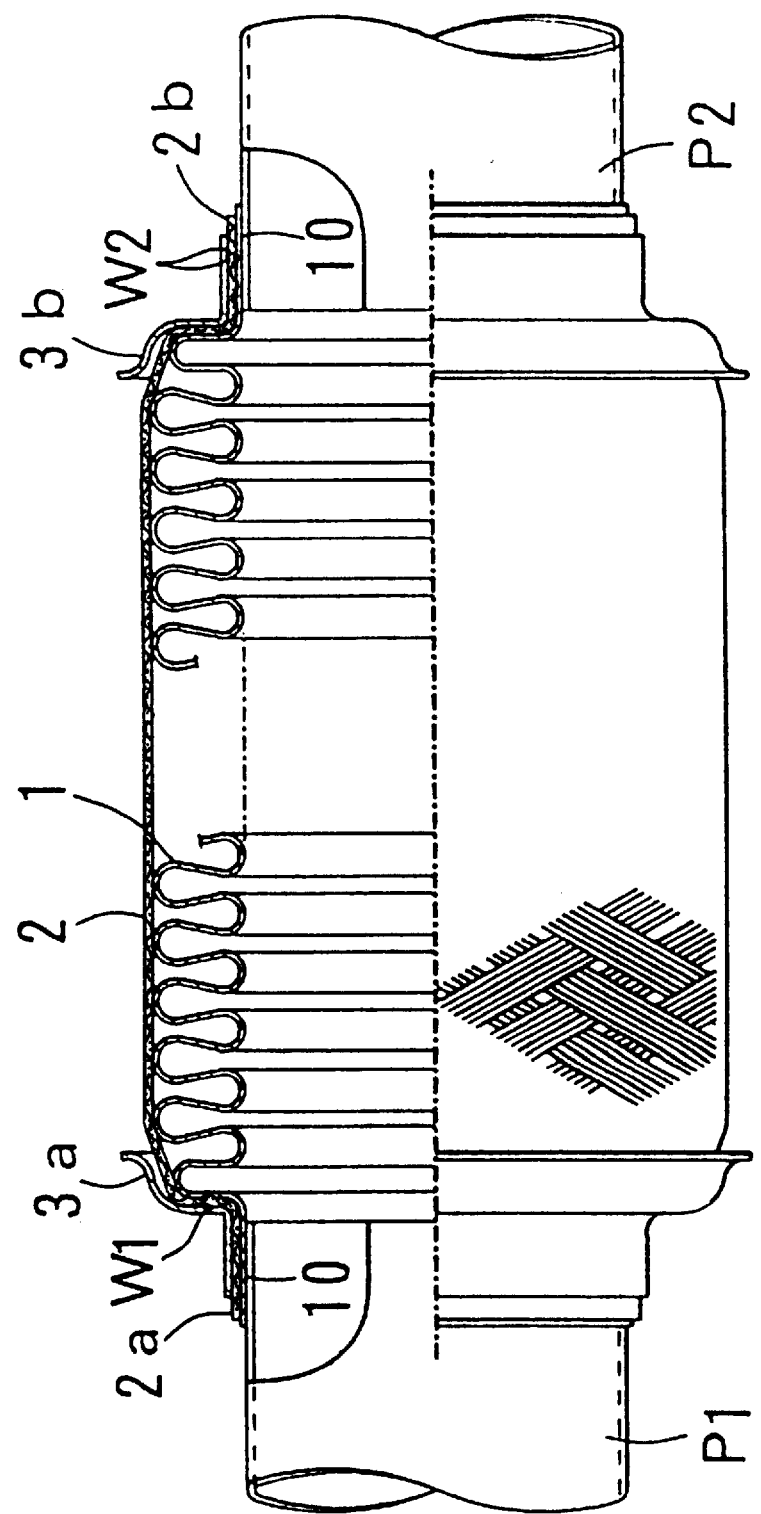
FIG. 3 is a front elevational view, partly in longitudinal cross-section, showing a second embodiment of the flexible joint according to the present invention.
Figure 4:
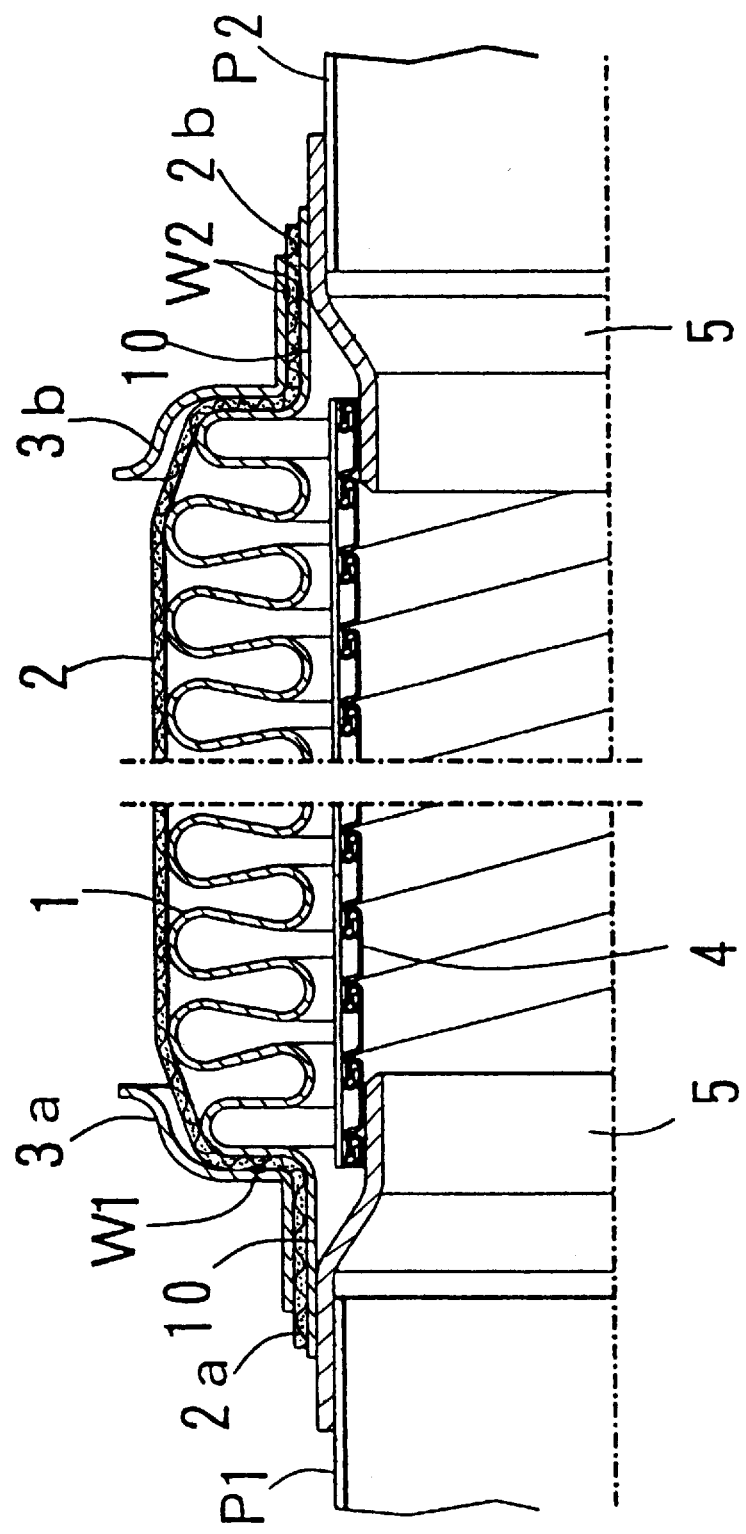
FIG. 4 is an enlarged front elevational view, in longitudinal cross-section, showing the main part of the flexible joint according to a third embodiment of the present invention.
Figure 5:
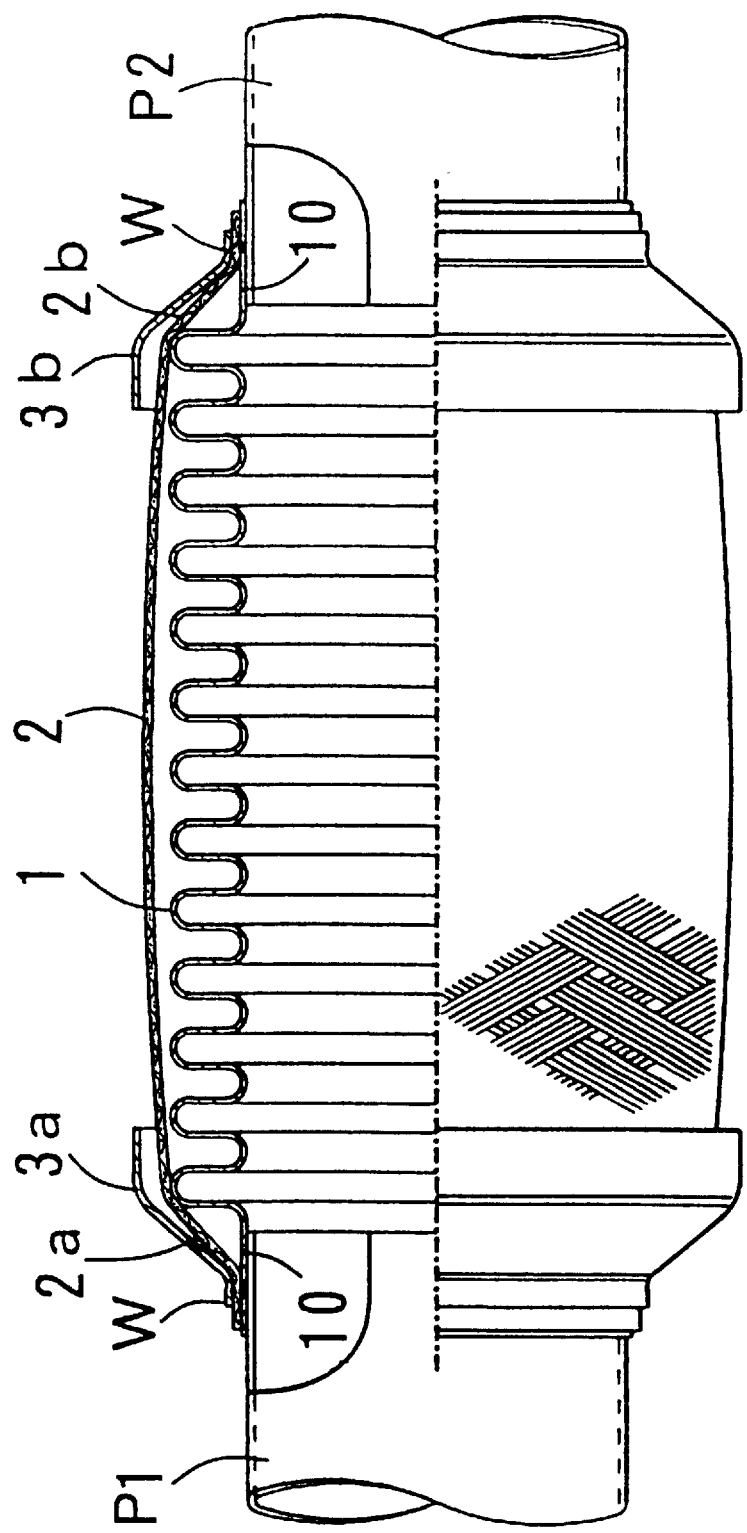
FIG. 5 is a front elevational view, partly in longitudinal cross-section, showing one example of a conventional flexible joint.
Figure 6:
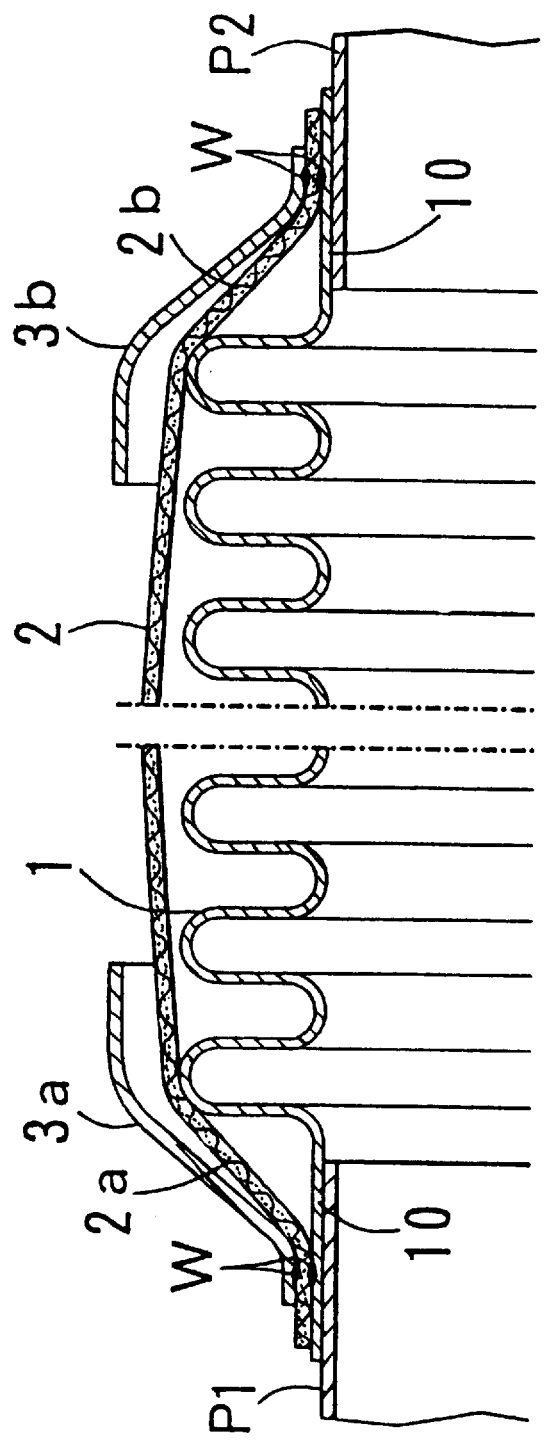
FIG. 6 is an enlarged view of the main part of the flexible joint shown in FIG. 5.

In the illustrated embodiment in FIG. 3, the exhaust pipes P1 and P2 are fittingly connected to both end parts of the bellows 1. In this case, a part of the exhaust pipe may be integrally formed in the shape of the bellows. Also, depending on necessity, the flexible inner pipe 4 may be installed as a heat guard, a rectifying pipe, etc. in the interior of the bellows 1. A reference numeral 5 designates a cylindrical joint pipe for mounting and supporting the inner pipe 4 inside the bellows 1.

As has been described so far, since the flexible joint according to the present invention is of such a construction that the braid 2 and each of the protectors 3a, 3b are overlaid sequentially and closely put together onto the lateral side surface 11a of the ridge part 11 at both end parts of the bellows, and then, at least, the protector 3a and the braid 2 are integrally fixed by spot-welding W1, etc. at the abovementioned overlaid part, it is possible to prevent the tensile force from concentrating at the fixed part of the braid, when a force is applied to the braid 2, as in the conventional flexible joint, to pull the bellows in the axial direction, whereby the durability of the flexable joint can be improved remarkably.

Further, at the time of covering the braid 2 on the outer periphery of the bellows, since the end part 2a of the braid 2 at the side of the protector 3a is fixed by the abovementioned spot-welding W1, etc., there is no possibility of unexpected narrowing of the bellows. Hence the covering can be done easily and the adjustment of the tension to the braid 2 can be effected easily, whereby the spring constant of the flexible joint can be simply and securely set at a desired value, and various other effects.

Although, in the foregoing, the present invention has been described with reference to a particular embodiment, it should be understood by those persons skilled in the art that the invention is not limited to this specific embodiment alone, but it is capable of a variety of alternative embodiments within the spirit and scope of the invention as recited in the appended claims.

What is claimed is:

1. A flexible joint comprising:
   a bellows having an intermediate portion, with a wave-shaped cross-section, between first and second cylindrical end parts, wherein said intermediate portion has a ridge part with a lateral side surface at first and second ends adjacent to said first and second cylindrical end parts, respectively;
   a cylindrical braid covering an outer periphery of said bellows;

first and second ring-shaped protectors fittingly held on a portion of an outer periphery of said cylindrical braid at first and second ends of said braid, respectively, said first and second ends of said braid covering said outer periphery of said bellows at said first and second cylindrical end parts thereof, respectively, wherein said braid and each of said first and second protectors arc overlaid on and closely adhered to said lateral side surfaces of said ridge parts at both said first and second cylindrical end parts of said bellows to form an overlaid portion, and said braid and at least one of said first and second protectors are integrally fixed at said lateral side surface of said overlaid portion by means of spot-welding.

2. The flexible joint as claimed in claim 1, wherein said braid and one of said first and second protectors are integrally fixed at said lateral side surface of said overlaid portion by means of spot-welding, and said braid and one of said first and second protectors and a cylindrical part at one of said first and second end parts of said bellows are integrally fixed by means of spot-welding.

3. The flexible joint as claimed in claim 1, wherein said braid and one of said first and second protector are integrally fixed at said lateral side surface of said overlaid portion by means of spot-welding, and said braid and both said first and second protectors and both said first and second cylindrical end parts at said first and second end parts of said bellows are integrally fixed by means of spot-welding.

\* \* \* \* \*